UNITED STATES PATENT OFFICE.

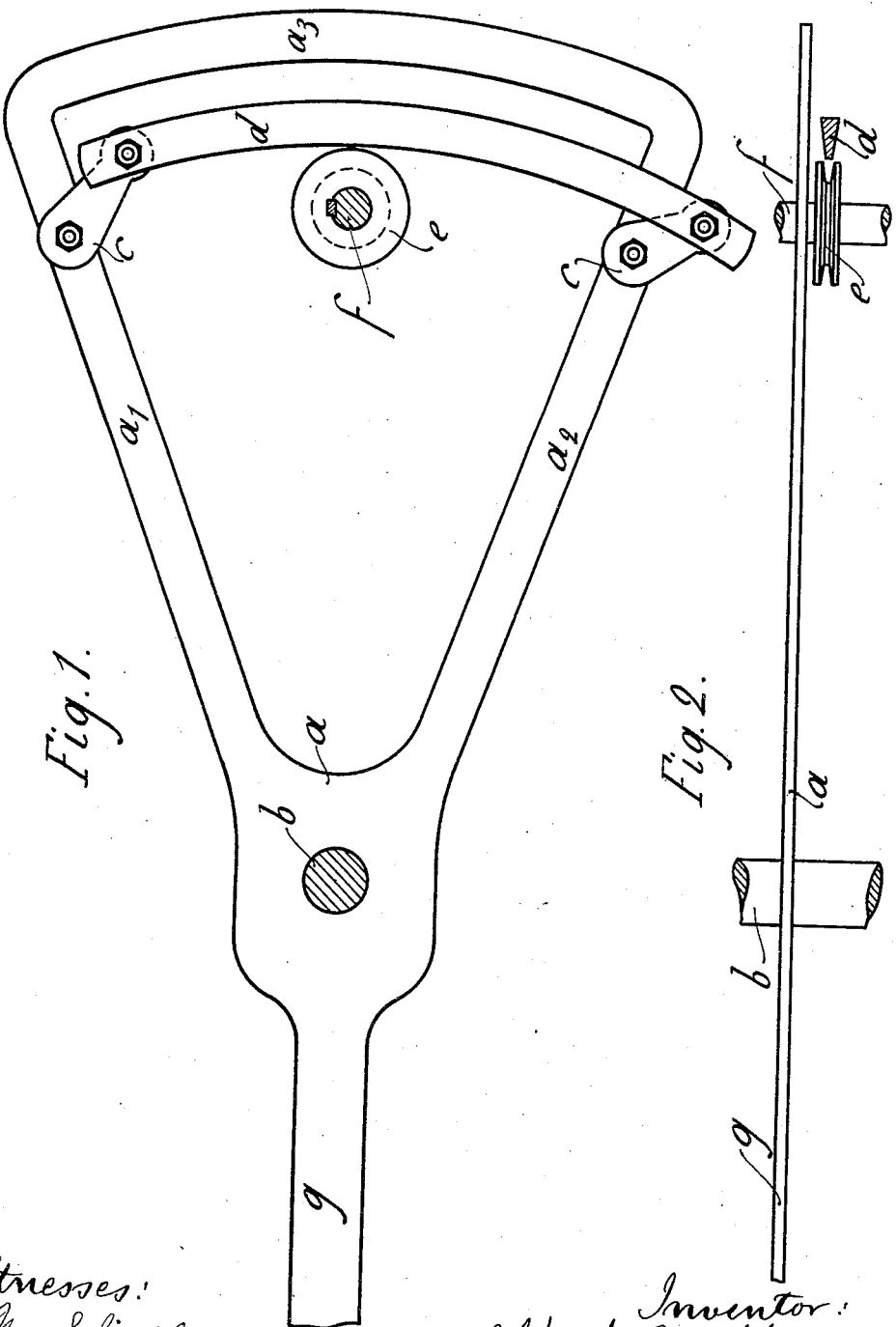

ALFRED MEHL, OF NUREMBERG, GERMANY.

INTERMITTENT-GRIP DEVICE.

999,175. Specification of Letters Patent. Patented July 25, 1911.

Application filed January 3, 1911. Serial No. 600,515.

*To all whom it may concern:*

Be it known that I, ALFRED MEHL, a citizen of the Empire of Germany, residing at Nuremberg, in the Empire of Germany, have invented a new and useful Intermittent-Grip Device, of which the following is a specification.

My invention relates to a very simple and safe transmitting gear, by means of which a reciprocating motion can be turned into a rotary motion. This transmitting gear comprises a sectoral lever adapted to vertically rock on or with a horizontal shaft, two links movable on said sectoral lever near its upper and lower edges, a bent rod connecting the two links, and a small wheel fastened on a second shaft parallel to said shaft and adapted to be driven by said bent rod during its upward stroke.

I will now proceed to describe my invention with reference to the accompanying drawing, in which—

Figure 1 is an elevation of the transmitting gear, two shafts being shown in section, and Fig. 2 is a plan view of the same, parts of the two shafts being broken away, the two links being omitted and the bent rod being shown in section.

Similar letters of reference refer to similar parts in both views.

$a$ is a sectoral open lever adapted to rock on or with a horizontal shaft $b$. In the space between the two arms $a'$ and $a^2$ and the arched bow $a^3$ a shaft $f$ parallel to $b$ is mounted to turn in suitable bearings (not shown), has fastened on it a small wheel $e$ and is adapted to drive some mechanism. Two links $c\ c$ are disposed on the two arms $a'$ and $a^2$ and are pivotally connected with one another by a bent rod $d$. The latter is shown to have a wedge-shaped cross section. In correspondence therewith the wheel $e$ is on its periphery grooved, so that the rod $d$ hanging down with the two links $c\ c$ can engage in the groove of the wheel $e$.

The lever $a$ is adapted to be rocked in any known manner. For example it is shown to have a rear arm $g$, which may be driven by hand or by some machine part (not shown). It will be understood, that on the arm $g$ being forced downward the lever $a$ will be turned upward, so that the rod $d$ engaging the wheel $e$ will take along with it by friction the wheel $e$, whereby the shaft $f$ will be turned in a direction opposite to that of the hands of a watch. In other words, the wheel $e$ and the rod $d$ will mesh together in a similar manner to friction wheels. When, however, the arm $g$ is moved upward, the lever $a$ will be turned downward, so that the friction of the wheel $e$ which continues to turn in the same direction will push the bent rod $d$ off from it, whereby the engagement between the two parts $d$ and $e$ is automatically stopped. This automatic disengagement can take place for any point of the bent rod, not at either end of the maximum stroke only, in other words the disengagement will instantaneously take place at the moment that the motion is reversed. On the arm $g$ being again forced downward, the bent rod $d$ will again engage and turn the wheel $e$, so that in this manner the shaft $f$ is rotated continuously in the same direction.

The transmitting gear presents the advantage, that the bent rod $d$ can automatically and softly engage the wheel $e$ and withdraw therefrom. The bent rod $d$ of wedge-shaped cross section may be replaced by its equivalent, for example it may consist of several juxtaposed bent rods of wedge-shaped cross section, or the several rods may be in one piece, from which parallel ribs of wedge-shaped cross section project. In this case the wheel $e$ will require to have a like number of parallel grooves. Or the bent rod $d$ may be replaced by a bent rack and the wheel $e$ by a pinion. Should any foreign body, for example, a small stone, happen to fall between the bent rod $d$ and the wheel $e$, it will simply push off the rod $d$ so that in the case of a friction wheel $e$ no part of the edge or ribs of the rod $d$ and in the case of a pinion no tooth of the rod will be damaged or broken off.

I claim:

In an intermittent transmission device, the combination with a wheel to be driven, of a vertically oscillating lever having extensions projecting above and below said wheel, a vertically disposed grip bar for engaging said wheel, and links pivoted to said bar and to the lever, above and below the wheel, the pivotal connection of the bar being disposed inwardly with respect to the wheel thereby causing a normal gravity engagement of the bar with the wheel, substantially as and for the purpose set forth.

ALFRED MEHL.

Witnesses:
 THEODOR LEVI,
 FRIEDR. DUMBECK.

Copies of this patent may be obtained for five cents each, by addressing the "Commissioner of Patents, Washington, D. C."